US010936347B2

(12) United States Patent
Restrepo Conde et al.

(10) Patent No.: US 10,936,347 B2
(45) Date of Patent: Mar. 2, 2021

(54) CONTEXTUAL VIRTUAL ASSISTANT COMMUNICATIONS

(71) Applicant: INTERNATIONAL BUSINESS MACHINES CORPORATION, Armonk, NY (US)

(72) Inventors: Melissa Restrepo Conde, Raleigh, NC (US); Trudy L. Hewitt, Cary, NC (US); Jonathan Smith, White Plains, NY (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

(21) Appl. No.: 16/252,588

(22) Filed: Jan. 19, 2019

(65) Prior Publication Data
US 2020/0233683 A1    Jul. 23, 2020

(51) Int. Cl.
*G06F 3/048* (2013.01)
*G06F 9/451* (2018.01)
*G06F 3/0484* (2013.01)
*G06N 20/00* (2019.01)

(52) U.S. Cl.
CPC ............ *G06F 9/453* (2018.02); *G06F 3/0484* (2013.01); *G06N 20/00* (2019.01)

(58) Field of Classification Search
CPC .......... G06F 3/00; G06F 3/048; G06F 3/0484; G06F 9/451; G06N 20/00
See application file for complete search history.

(56) References Cited

U.S. PATENT DOCUMENTS 9,189,645 B2    11/2015  Borzycki et al.
9,661,105 B2     5/2017  Sharma et al.
10,304,442 B1 *  5/2019  Rudden ................. G10L 15/063
(Continued)

OTHER PUBLICATIONS

Anonymous, "Method and system for enhanced collaboration systems privacy", IP.com Prior Art Database Technical Disclosure, Dec. 27, 2012, IPCOM000215429D.
(Continued)

*Primary Examiner* — Xiomara L Bautista
(74) *Attorney, Agent, or Firm* — Gregory M. Nordstrom

(57) ABSTRACT

A method comprises a computer-implemented contextual virtual assistant (CVA) analyzing one or of a user corpus and input user information to determine to communicate user information to a primary recipient. In the method, the CVA receives information associated with a recipient context that includes the primary recipient, and can determine from the context information that an ancillary recipient is privy, in the recipient context, to information output by the system. The CVA further determines, in the method, output information, based on the user information, and a recipient context to communicate to the primary recipient. The recipient context, comprises a preferred location of the primary recipient, and preferred time, to communicate the output information. A CVA system includes a user corpus, CVA input and output devices, and processors. The processors can perform the method. A computer program product can include instructions to cause one or more processors to perform the method.

20 Claims, 4 Drawing Sheets

(56) References Cited

U.S. PATENT DOCUMENTS

| | | | |
|---|---|---|---|
| 2015/0186154 A1* | 7/2015 | Brown | G06Q 10/10 |
| | | | 715/706 |
| 2017/0085547 A1* | 3/2017 | De Aguiar | A61B 5/055 |
| 2017/0132199 A1 | 5/2017 | Vescovi et al. | |
| 2017/0358302 A1* | 12/2017 | Orr | G06F 16/433 |
| 2018/0101599 A1* | 4/2018 | Arnold | G06F 16/338 |
| 2019/0294407 A1* | 9/2019 | Beck | G06F 3/165 |
| 2020/0134211 A1* | 4/2020 | Miller | H04W 12/02 |

OTHER PUBLICATIONS

Anonymous, "Augmenting a User Profile", IP.com Prior Art Database Technical Disclosure, Jul. 26, 2010, IPCOM000198121D.

IBM, "Data Privacy Manager (DPM): software to assign different levels of privacy to personal documents and applications managing them through virtual desktops", IP.com Prior Art Database Technical Disclosure, Mar. 23, 2004, IPCOM000022651D.

Unknown, "Filtering a Request to Communicate with a User", IP.com Prior Art Database Technical Disclosure, Jun. 26, 2012, IPCOM000219217D.

* cited by examiner

CONTEXTUAL VIRTUAL ASSISTANT COMMUNICATIONS

BACKGROUND

The present disclosure relates to communicating information from a computing system to an information recipient. More specifically, the present disclosure relates to a computer-implemented virtual assistant system communicating information to an information recipient.

SUMMARY

According to embodiments of the present disclosure (hereinafter, "embodiments"), a computer-implemented method comprises a computer implemented contextual virtual assistant (CVA) system performing an analysis of a user corpus and/or CVA input information to determine user informtion to communicate to a primary recipient. The method further comprises the CVA system applying machine learning and/or natural language processing to determine the user information. According to the method, the CVA receives input context information corresponding to a recipient context that includes the primary recipient. In response, the CVA analyzes the input context information to dtermine information recipients included in the recipient context. Based on the recipients included in the recipient context, in the method the CVA determines that an ancillary recipient is present in the recipient context and is privy, in the recipient context, to CVA output information communicated by the CVA system.

The method further comprises the CVA system applying machine learning and/or natural language processing to a user corpus and one or both of the user information and the input context information to determine alternative user information, and a second recipient context to communicate the alternative user information to the primary recipient. The second recipient context includes a preferred location of the primary recipient and a preferred time to communicate the alternative user information.

A computer-implemented CVA system comprising a user corpus, CVA input devices, CVA output devices and processors can embody aspects and operations of the method.

The computing devices included in the VA can include a learning processor and/or a natural language processor.

Embodiments can include a computer program product having processor instructions to cause one or more processors to perform aspects of the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
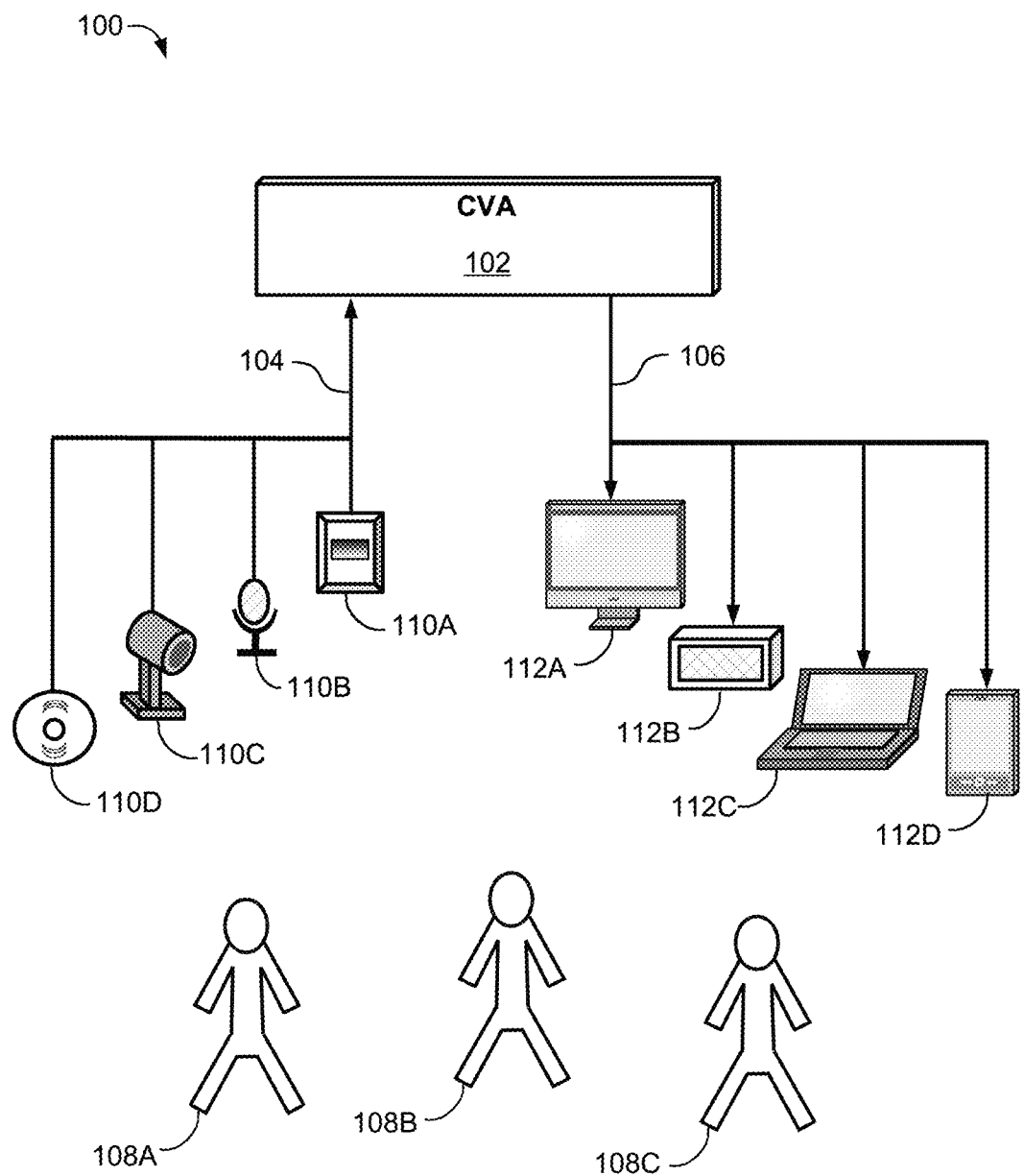
FIG. 1 is a block diagram illustrating a computing system utilizing a contextual virtual assistant (CVA), according to aspects of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure (hereinafter, "the disclosure") relate to communicating information from a computing system to an information recipient. More particular aspects relate to a computing system utilizing a Contextual Virtual Assistant (CVA) to determine a preferred presentation to communicate information to an information recipient. While the present disclosure is not necessarily limited to such applications, various aspects of the disclosure may be appreciated through a discussion of various examples using this context.

Computing systems can assist human persons with various activities, such as searching for information about a particular topic, managing daily appointments, communicating information received from other parties (e.g., voice or e-mail messages), performing particular daily activities (e.g., health related activities), and so forth. For example, computer-implemented "virtual assistants" can assist human persons with such activities. In embodiments of the disclosure (hereinafter, "embodiments"), a computer-implemented "Contextual Virtual Assistant (CVA)" can improve virtual assistant operations to process and/or communicate personal information, associated with a particular person, such as a "user" of a CVA, and/or resources used by a particular person, to that person and/or other "information recipients". As used herein, "user" of a CVA (for brevity, hereinafter "user") refers to a person assisted by a CVA. For example, in an embodiment a user can be a person that is the principle person utilizing that CVA, or that controls, or otherwise administers, that CVA, and/or that is a subject of personal information available to a CVA.

"Personal information", as used herein, refers to information associated with a user and/or associated with person other than a user, such as a person having a personal, business, medical, or social relationship with a user. In embodiments, such personal information can be any type of information associated with a particular person, such as biographical information, identification information, medical information, and/or information related to an activity (e.g., professional or personal tasks, appointments, interests, etc.) associated with a particular person. Such types of information are examples of personal information that a CVA can process but are not intended to limit embodiments. It would be apparent to one of ordinary skill in the art that in embodiments a CVA can process personal information that can include any variety or type of information associated with a user, or other person, within the scope of the disclosure.

An "information recipient", as used herein, is any person that, in an embodiment, receives "user information" communications from a CVA. Such a person can be a user of a CVA and/or a person privy to information communicated from a CVA (e.g., output via a CVA output device). Drawing from the conventional definition of "privy" to refer to "participating in the knowledge of" information, as used herein "an information recipient privy to" refers to an information recipient able to receive or observe ("participate in knowledge of") information (e.g., user information) output from a CVA, such as to hear, see, receive electronically, or otherwise have access to information output from a CVA (e.g., output via a CVA output device). As further used herein, "user information" refers to one or more components of personal information that a CVA can, or does, communicate to information recipients. An information recipient can be, for example, a user of the CVA and/or one or more other persons in proximity to a user so as to be able to see, hear, or otherwise receive or access communications from a CVA to a user. Information recipients (for brevity, hereinafter "recipients"), can include a "primary recipient" and/or one or more "ancillary recipients".

In embodiments, a primary recipient can be a user of the CVA or, alternatively, can be another person intended to receive user information from a CVA (e.g., a physician providing care for a user of the CVA). An ancillary recipient, in embodiments, can be person other than a primary recipient, that receives user information from a CVA in conjunction with CVA communications to a primary recipient. For example, an ancillary recipient can be a person in proximity to a primary recipient in a particular environment (e.g., a room of a building, or participating a telephonic conference) at a time that a CVA communicates user information to a primary recipient. An ancillary recipient can be a person otherwise privy to CVA communications of user information to a primary recipient, such as a person participating in a multi-media, or Internet conference. In embodiments, an ancillary recipient can be an "incidental recipient", such as a person that is not an intended recipient of CVA output information but that can see, hear, or otherwise receive information output by the CVA, such as simply by virtue of being present in an environment (e.g., an environment of an activity, such as a social activity or a web or telephonic conference) of a primary or other ancillary recipient, and/or without taking any particular action to receive or access the CVA output information. An incidental recipient can be a person not authorized by a user to receive CVA output information but nonetheless privy to the CVA output information as a consequence of being present in an environment of a primary or other ancillary recipient.

FIG. 1 illustrates an example virtual assistant system that includes a CVA. In FIG. 1, virtual assistant system 100 comprises CVA 102; CVA input devices 110A, 110B, 110C, and 110D (collectively, "devices 110"); CVA output devices 112A, 112B, 112C, and 112D (collectively, "devices 112"); and, information recipients 108A, 108B, and 108C (collectively, "recipients 108"). In embodiments, CVA 102 can comprise hardware components (e.g., computers and/or computing devices, mobile devices, processors, and/or specialized electronic circuits), software components (e.g., firmware or software modules, licensed program products, and/or other forms of computer instructions), or combinations thereof.

A CVA can receive "CVA input information" from input devices. In embodiments CVA input information can include an electronic communication, such as an email or text message containing, or related to, personal information associated with a primary recipient. Such personal information can include, for example, information related to tasks a user performs, such as routine daily, household, educational, and/or business tasks.

CVA input information can comprise information about a "recipient context", associated with a CVA communicating user information to one or more recipients. In embodiments a recipient context, can include, for example, a location (e.g., a GPS or building location); one or more persons who can be recipients of user information, such as a primary recipient and persons present with a primary recipient, or otherwise privy to receiving user information communicated from a CVA; an activity in which a primary recipient is, or can be, engaged, such as a social visit, meeting or web conference, or recreational activity; and, other environmental features or conditions surrounding one or more recipients at a time a CVA may communicate user information to a recipient. As used herein, "recipient activity" refers to any activity in which a primary recipient of CVA output information is, or may be, engaged at a time the CVA may output CVA output information, such as, but not necessarily limited to, the foregoing examples of activities included in a recipient context.

In embodiments a CVA can receive CVA input information from input devices by means of interfaces (e.g., wires or communications interfaces, or programming interfaces) and/or various forms of electronic data transfer and/or communications (e.g., electronic transfer of data files, emails, text messages, and/or streaming media). To illustrate, in FIG. 1 CVA input devices, among devices 110, can be communicatively coupled to CVA 102 by interface 104, and CVA 102 can receive CVA input information from one or more devices among devices 110 from interface 104. In embodiments CVA input devices can comprise a variety of devices that can provide CVA input information to CVA 102. For example, in an embodiment, input device 110A can be a motion sensor, input device 110B can be a microphone, input device 110C can be a camera, and, input device 110D can be a thermal and/or gas (e.g., smoke or carbon monoxide) sensor. While not shown in FIG. 1, such input devices can include devices associated with particular persons, such as a "smart watch" or a GPS device, worn by a recipient among recipients 108, or a computing device (e.g., a laptop) used by a recipient among recipients 108. While not shown in FIG. 1, a CVA can receive CVA input information (e.g., information associated with a user) from a database, and the database can be included in, for example, a computing device, or a computer, such as a server computer coupled to a CVA by a network (e.g., the Internet).

Additionally, in embodiments CVA input devices, such as devices 110 in FIG. 1, can include "Internet of Things (IoT)" devices. In embodiments, IoT devices can include, for example, home appliances, tools, vehicles, home or building controls and/or monitors, medical instruments, computing devices, articles of manufacture utilizing or comprising a computing device, and so forth. IoT devices can include sensors—such as thermal, motion, image, and/or sound sensors—and the sensors, and/or IoT device itself, can provide CVA input information to a CVA. For example, an IoT device can monitor and/or record past usage or maintenance information associated with that IoT device (or, a device incorporating that IoT device), and can communicate to a CVA, as CVA input information, for example, a notification that maintenance is required to remedy a problem, or that maintenance is due at some upcoming time.

Continuing the example of FIG. 1, a recipient among recipients 108 (e.g., 108A) can be persons included in a recipient context and, as previously described, a CVA can determine the recipient context and/or persons present in that context based on CVA input information, such as information received from input devices among devices 110.

A recipient context can include primary and/or ancillary recipients. In FIG. 1, for example, recipient 108A can be a primary recipient and other recipients among recipients 108 (e.g., 108B and 108C) can be ancillary recipients that can receive, or otherwise be privy to, a communication of user information from CVA 102 to recipient 108A.

In embodiments a CVA, such as 102, can utilize output devices, such as among devices 112, to communicate user information to one or more recipients among recipients 108. For example, in an embodiment output device 112A can be a graphical display device, output device 112B can be a speaker, output device 112C can be a laptop computer, and output device 112D can be a mobile device, such as a smartphone or tablet. It would be apparent to one of ordinary skill in the art that CVA output devices, such as among devices 112, can provide CVA input information to a CVA. For example, a laptop device among devices 112 can provide CVA 102 (by means of interface 106, for example) with information to direct operations of CVA 102, such as a commands or queries input from a recipient.

In embodiments, a CVA can process (e.g., analyze) personal information and can correspondingly communicate to a primary recipient, and/or one or more ancillary recipients, user information comprising some, or all, of that personal information, such as, for example, a notification of an activity, or task, associated with that personal information. For example, a CVA can have personal information associated with an appointment calendar for a user, and a CVA can analyze the calendar, and/or other personal, information and determine to notify a primary recipient (e.g., the user, or another party associated with that appointment) that an appointment is scheduled for a particular time, for example to assist the primary recipient to prepare for, and/or travel to, that appointment. In another example, a CVA can have personal information about a business task (e.g., blueprints associated with a building project) associated with a user, and a CVA can communicate that information, and/or related information, to recipients that can include a primary recipient (e.g., the user) and one or more ancillary recipients, such as business colleagues of the primary recipient.

In embodiments, components of personal information can have particular "information attributes", such as a type of information, a privacy attribute, and/or an urgency attribute. For example, in an embodiment a "type" of personal information can be identity information, medical information, contact or relationship information, and/or business information. A type of personal information, such as an identity or relationship, can be associated with a user and/or an information recipient included in a recipient context. In an embodiment, personal information can have a privacy attribute associated with a particular confidentiality of that information. For example, personal information that includes, or is based on, user medical information can have a "high" privacy attribute, corresponding to limiting communication of that information, and/or information related to that information, to a user and/or particular medical professionals. A CVA can limit communication of user information having, or associated with, a high privacy attribute to only a primary recipient, and/or select ancillary recipients (e.g., recipients who may act on the information in cooperation with, or on the behalf of, a primary recipient), and/or a recipient context that accordingly limits communication of that user information to only those recipients.

Personal information can include less private information, such as a generic message (e.g., "You have an update to a social media account.") that may be received (e.g., in an email or text message included in the personal information) from a friend or contact. In embodiments such information can have, for example, a "medium" privacy attribute. Based on personal information having such a medium privacy attribute, a CVA can communicate user information included in, or based on, that personal information to a primary recipient in a recipient context, for example, that includes, for example, ancillary recipients acquainted with or, having a particular relationship to, a primary recipient.

Personal information, such as a weather report received (e.g., by means of a mobile application) for a primary recipient, can be information that is relatively non-confidential, and, in an embodiment, such information can have, for example, a "low" privacy attribute. In an embodiment a CVA can communicate such information to a primary recipient without regard, for example, to a particular recipient context, and/or ancillary recipients that may also then receive that information (e.g., ancillary recipients present in a location at which a primary recipient receives the information audibly).

In embodiments, a CVA can communicate information to a recipient based on "recipient attributes" associated with that recipient, and/or other potential recipients. A recipient attribute can include a recipient privacy attribute corresponding to privacy attributes of personal information to which that recipient can be privy. For example, particular recipients can have a recipient privacy attribute corresponding to being privy to personal information having a high or medium privacy attribute, while other recipients can have a recipient privacy attribute corresponding to only personal information having a low privacy attribute. In another example, a recipient attribute can correspond to a relationship of a recipient to a user that is the subject of particular personal and/or user information, and such a relationship attribute can imply, or be associated with, privacy attributes of the recipient and/or personal or user information.

Additionally, in embodiments personal information can have an "urgency attribute", which can be associated with a timeliness to communicate the information. For example, in embodiments a CVA can receive information from environmental sensors, and the information from such sensors can indicate a dangerous, or hazardous, condition (e.g., the presence of carbon monoxide, or smoke) in the proximity of a recipient. Accordingly, a CVA can associate, for example, a "high" urgency attribute with the information received from such sensors, as user information to communicate as quickly as possible to a primary recipient (as well as, potentially, ancillary recipients present subject to the same conditions). In another example, in an embodiment user information associated with an upcoming appointment can have a high urgency level associated with time required for a recipient (e.g., a user) to prepare for, or travel to, an imminent meeting.

Embodiments can further associate user information with, for example, a "low" urgency attribute. In embodiments, low urgency user information can include, for example, a notification of a package delivery that will occur at some later time (e.g., a time days or weeks later). It would be apparent to one of ordinary skill in the art that embodiments can include intermediate urgency classifications, or attributes, of personal information within a range between "high" and "low", and particular criteria (e.g., a relationship between the information and a particular time a recipient needs to receive and/or act on that information) associated with each of a variety of urgency attributes.

In embodiments, a CVA can analyze personal information, and/or CVA input information, utilizing information and/or recipient attributes (e.g., privacy and/or urgency attributes) associated with that information and/or CVA input information. Based on that analysis, a CVA can "compose" user information, as a subset of, or based on, the personal information, and/or a "preferred presentation" to communicate that user information. In embodiments, "composing" user information and/or a preferred presentation can comprise a CVA determining, and/or combining, elements of personal information, a recipient context, and/or an output means in a form usable by a CVA to analyze, store, and/or output these elements (e.g., as a collection of information in data files, and/or a form for output to an output device).

A preferred presentation, in embodiments, can comprise user information, a "presentation context", and an output means for a CVA to communicate the user information to one or more recipients. In embodiments, a presentation context can comprise a recipient context in which a CVA can communicate (e.g., output) user information to a primary recipient (e.g., a user) based on content of the user information, recipients that may be privy to the CVA communicating user information, and/or information and/or recipient attributes of the information and/or recipients. For example, a presentation context can be a recipient context that includes a particular location, and/or particular recipients, and/or comports with privacy and/or urgency attributes associated with the user information and/or recipients.

A CVA can compose a preferred presentation that includes user information, a presentation context, such as just described, and an output means to communicate user information (e.g., a display, audio device, a laptop, or mobile device) within a presentation context, such as an output means that assures that only recipients appropriate, or authorized, to receive the user information are privy to the CVA communicating that information.

Figure 2:
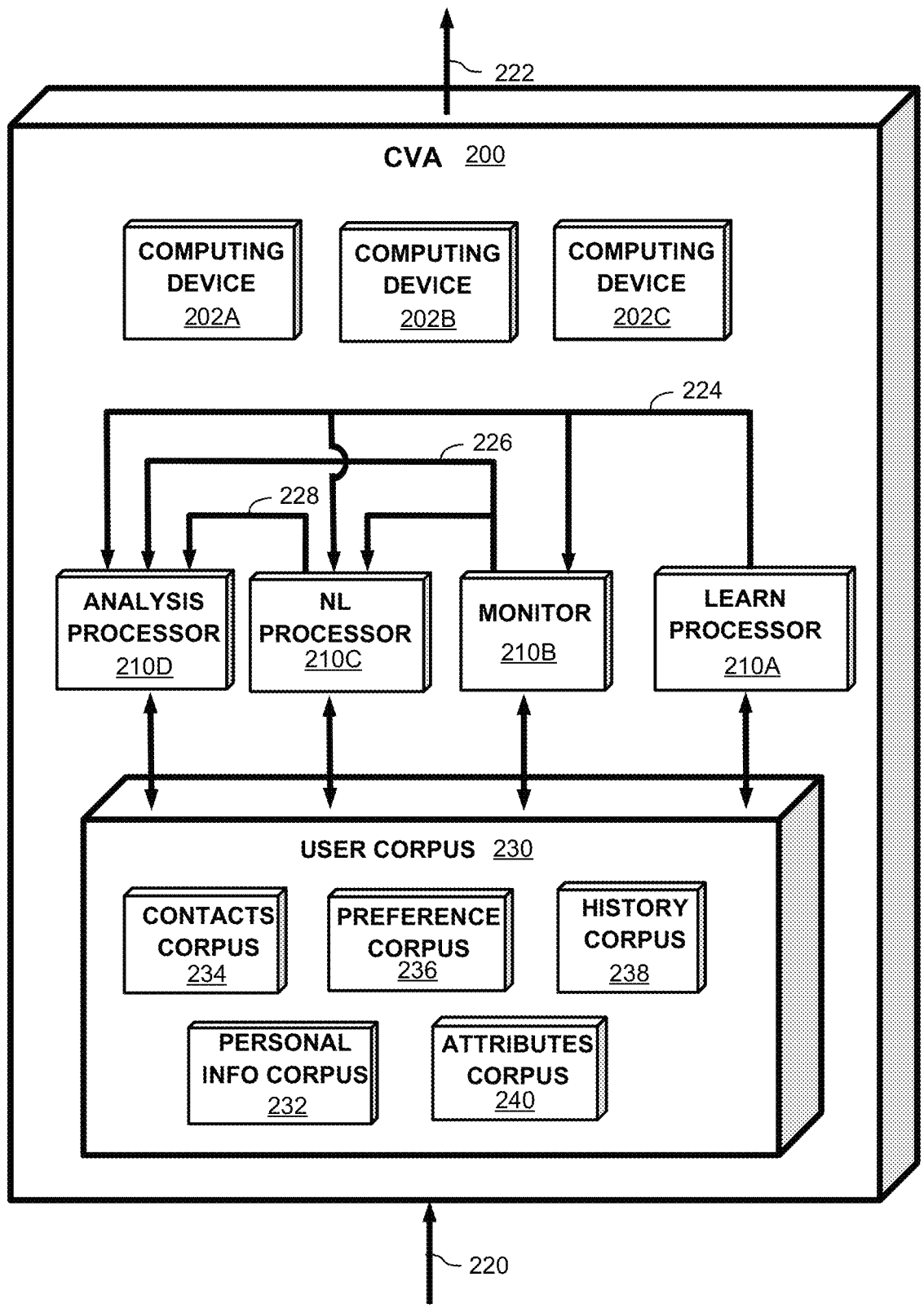
FIG. 2 is a block diagram illustrating elements of a CVA, according to aspects of the disclosure.

FIG. 2 illustrates an example CVA that can perform CVA functions such as to receive CVA input information, determine and/or compose user information to communicate to a recipient (or, recipients), determine a recipient context, compose a preferred presentation, and/or output (e.g., using CVA outputs) user information according to aspects of a preferred presentation. The description of FIG. 2 to follow illustrates structures, functions, and operations that can comprise embodiments, and as such it is understood that the description of the examples of FIG. 2 implicitly incorporates the phrase "in embodiments", without the necessity of repeating this phrase to introduce and/or qualify each aspect of the example of FIG. 2. For example, in the description of the example of FIG. 2, a statement such as "A CVA can comprise . . . ", or "A CVA can do . . . " implicitly incorporates "in an embodiment", such as "in an embodiment, a CVA can comprise . . . ", or "in embodiments, a CVA can do . . . ".

Further, the example of FIG. 2 serves to illustrate aspects of the disclosure but is not intended to limit embodiments. It would be apparent to one of ordinary skill in the art that aspects of the disclosure, such as illustrated by the examples of FIG. 2, can be embodied in structures, functions, and/or operations not limited by the example of FIG. 2, within the scope of the disclosure.

In FIG. 2, example CVA 200 comprises CVA inputs 220, CVA outputs 222, user corpus 230, and computing devices 202A, 202B, and 202C. CVA 200 further includes processing elements learn processor 210A, monitor 210B, natural language (NL) processor 210C, and analysis processor 210D, referred to collectively as "processors 210". In an embodiment, such processing elements can perform (individually, and/or collaboratively) CVA functions such as previously described.

CVA 200 can receive CVA input information by means of CVA inputs 220. CVA inputs 220 can be wires, signals, programming interfaces, and/or other communications interfaces of devices such as devices 110 and/or devices 112 previously described with reference to FIG. 1. Such CVA input information can include, for example, personal information to include in a user corpus, such as information (e.g., calendar notices, or emails) output, or received, from computing applications (e.g., calendar or email applications). In another example, such CVA input information can include information that can enable, or assist, a CVA to determine the presence (and/or identities) of particular persons among information recipients (e.g., recipients among 108 in FIG. 1). From inputs such as 220, a CVA can receive CVA input information indicating aspects of a recipient context, such as that a primary recipient is engaged in a conversation with other parties proximate to that recipient, or that a primary recipient is engaged in a work activity, such as working at a computer, or participating in a web or telephone conference.

CVA outputs, such as 222, can be coupled to output devices (such as among devices 112 previously described with reference to FIG. 1) and CVA 200 can output user information, using devices coupled to CVA outputs 222, to communicate user information to recipients. For example, CVA outputs 222 can be coupled to an audio speaker and CVA 200 can output user information as audio data 222 on CVA outputs 222 that the speaker can then present audibly to recipients.

Processing elements of a CVA (such as processors among processors 210 included in CVA 200) can comprise computing devices, software, or a combination thereof. For example, CVA 200, and/or processing elements of CVA 200, can comprise one or more of firmware, software, and/or computer program product modules. Such modules can include modules to perform specific CVA functions, and/or modules to perform functions—such as operating system, virtualization, software execution, and/or input/output functions—in support of CVA functions. A CVA, and/or a processing element among processors 210, In embodiments, a CVA can include computing devices, which can perform functions of, and/or in support of, a CVA. As shown in FIG. 2, CVA 200 includes computing devices 202A, 202B, and 202C (hereinafter, devices 202"). Computing devices among devices 202 can comprise one or more general and/or special purpose computing devices (e.g., computer processors and/or co-processors), and/or electronic circuits, such as computing devices or circuits to execute software modules, and/or to perform functions of, and/or in support of, a CVA. Computing devices among devices 202 can comprise processing elements of a CVA, such as among processors 210, and/or can execute software (e.g., computer instructions and/or applications) that implement processing elements of a CVA, such as among processors 210. While FIG. 2 depicts computing devices 202 included in CVA 200, this is not intended to limit embodiments and it would be apparent to one of ordinary skill in the art that such computing devices need not be included, or need not all be included, in CVA 200 and that such computing devices can be computing devices communicatively coupled to CVA 200.

In embodiments, a CVA can utilize a user corpus, such as 230, to perform CVA functions. For example, a CVA can obtain from a user corpus, and/or store in a user corpus, information to perform CVA functions. In embodiments, a user corpus can comprise, for example, a database, and/or a set of data files (e.g., text or multi-media files), and a user corpus can be included within a CVA (e.g., stored on a storage medium of a computing device that performs CVA functions), or can be communicatively coupled to a CVA (e.g., stored on a storage medium of a network computing device, such as a server computer). Information included in a user corpus can include, for example, personal information, CVA input information, information and/or recipient attributes, historical information, and/or user preferences.

A CVA can use information included in a user corpus, for example, to analyze personal information and/or CVA input information, to determine user information to communicate to a recipient and/or a recipient context, and/or to compose user information and/or a preferred presentation for communicating user information. To illustrate, in FIG. 2 example user corpus 230 comprises personal info corpus 232, contacts corpus 234, preferences corpus 236, history corpus 238, and attributes corpus 240.

In embodiments, personal info corpus 232 can include, for example, user information such as calendar, medical, health measurements, activity data, identity data, data used in a user's profession, and so forth. A CVA can determine user information to communicate to a recipient from among, or based upon, information in personal info corpus 232.

A user and/or recipients can have relationships among each other and/or other persons, and a CVA can obtain information about such persons or relationships, from and/or store such information in, a user corpus, such as in contacts corpus 234 of user corpus 230. Contacts corpus 234 can comprise, for example, a registry of other persons having particular relationships (e.g., family member, medical practitioner, colleague, friend, etc.) with a user associated with, or subject of, personal information, such as can be included in user corpus 230 in personal info corpus 232. Such a registry can include, for example, identifying information (e.g., physical characteristics such as visual images, finger prints, or voice patterns) corresponding to persons included in the registry.

In embodiments a user can specify particular preferences associated with personal information, and/or preferences associated with communicating user information to recipients, and a user corpus can include such preferences. For example, preferences corpus 236 can include particular information specifying that a CVA can (or, alternatively, cannot) share with one or more other persons (e.g., persons included in contacts corpus 234) particular personal information (e.g., information included in or related to personal info corpus 232). Preferences corpus 236 can include, for example, particular presentation contexts, or aspects of particular presentation contexts, in which a CVA can communicate user information. In another example, preferences corpus 236 can include particular means by which a CVA can, or preferentially should, communicate user information, such as communicating some information (e.g., information having a low privacy attribute) visually or audibly (e.g., on a TV monitor or a speaker system), and communicating other information (e.g., information having a high privacy attribute) on more secure devices, such as personal laptops or mobile devices.

A user corpus can include historical information regarding, for example, aspects of prior user information communications, recipient and/or presentation contexts, a user and/or recipients, interactions among a user and/or recipients, previous CVA input information, results of prior analysis and/or processing of CVA input information and/or personal information, and so forth. In user corpus 230, history corpus 232 can include such historical information.

A user corpus, such as 230, can include information and/or recipient attributes, and/or information for a CVA to determine such attributes. Attributes included in a user corpus can include, for example, privacy and/or urgency attributes such as previously described. Such attributes can be included, for example, in attributes corpus 240 of user corpus 230, and/or can be associated with other information included in user corpus 230.

While FIG. 2 illustrates user corpus 230 as included in CVA 200, and various corpora included within user corpus 230, this is not intended to limit embodiments. It would be apparent to one of ordinary skill in the art that, in embodiments, such corpora can be included in, or comprise, other components of a computing system communicatively coupled to a CVA, such as a database, or a computing device, or a computer, on coupled to a CVA by a network (e.g., a server on the Internet to a CVA). It would be further apparent to one of ordinary skill in the art that corpora of a user corpus 230 can be included in a single corpus, as 230, or, alternatively, can be distributed among more a plurality of user corpora, and can include elements in addition to, or in lieu of, those illustrated in FIG. 2 as included in user corpus 230.

As just described, a CVA can obtain information and/or recipient attributes from a corpus, or compute information and/or recipient attributes using a corpus, such as user corpus 230. However, in embodiments a CVA need not rely on such attributes as stored in a corpus (or, alternative source for a CVA to obtain such attributes). In embodiments a CVA can obtain or compute user information, information attributes, and/or recipient attributes dynamically, in response to, or in conjunction with, analyzing personal information, a recipient context, and/or CVA input information, and/or composing user information and/or a preferred presentation.

For example, CVA 200 can determine a recipient context based on CVA input information, and can dynamically (e.g., in response to, or in conjunction with, determining that recipient context) obtain or compute privacy attributes of user information and/or recipients based on that recipient context. In another example, CVA 200 can dynamically (e.g., in response to, or in conjunction with, determining user information and/or a recipient context) obtain or compute urgency attributes of user information and/or recipients, based on content of the user information and/or a recipient context.

In conjunction with, or subsequent to, determining user information to communicate to a recipient (e.g., a primary recipient, such as a user), a CVA can analyze CVA input information to detect recipients within a recipient context. In response, a CVA can obtain, or compute, information attributes and/or recipient attributes associated with the recipients included in that recipient context, such as, for example, that a recipient is a primary, ancillary, and/or incidental recipient. A CVA can dynamically determine user information (e.g., alternative user information), and/or a presentation context (e.g., the recipient context the CVA detected, or an alternative presentation context) to communicate the user information, that can comport with the recipient context, information attributes, and/or recipient attributes. A CVA can compose a preferred presentation (e.g., the user information, a presentation context, and/or output means) based on the dynamically determined user information, recipient context, information attributes, and/or recipient attributes.

In embodiments, a CVA, such as 200 in FIG. 2, and/or processing elements of a CVA (e.g., among processors 210 of CVA 200 in FIG. 2), can (individually or, alternatively, collaboratively) perform CVA functions. For example, monitor processor 210B can receive CVA input information—such as from CVA inputs 220, and/or user corpus 230—to determine that a primary, and/or ancillary recipients, are able to receive user information from CVA 200. For example, inputs 222 can include voice information received from a microphone and monitor 210B can receive and analyze that information to determine that the voice information indicates the presence of potential information recipients in a room in which the microphone is located. Monitor processor 210B can analyze and/or utilize information from user corpus 230 to determine, for example, identities and/or a number of potential recipients of user information from CVA 200. Monitor processor 210B can modify, or add to, information in a user corpus (such as the elements of user corpus 230) based on, or to include information received and/or analyzed by monitor 210D. (e.g., to add these results and/or determinations to history corpus 238).

As illustrated by 226 in FIG. 2, monitor 210B can output CVA input information received from CVA inputs, such as 220, and/or information related to that information, to analysis processor 210D and/or NL processor 210C. NL processor 210C can comprise, for example, a natural language processing element and can perform natural language processing of information received from monitor 210B outputs (and/or CVA input information received from CVA inputs 220). Such natural language processing can include, for example, analyzing conversation among potential recipients, received as CVA input information by NL processor 210C as output 226 from monitor 210B, and/or audio input among CVA inputs 220.

In analyzing such inputs or information, NL processor 210C can analyze and/or utilize CVA input information received from CVA inputs 220 and/or included in user corpus 230. NL processor 210C can, for example, analyze conversational input received from CVA inputs 220, and can use information from user corpus 230, for example, to identify subject matter of a conversation, and/or to identify persons participating in the conversation. NL processor 210C can output the results of such natural language analysis to analysis processor 210D, as illustrated by 228 in FIG. 2, and analysis processor 210D can use the results to perform CVA functions such as previously described. NL processor 210C can modify, or add to, information in a user corpus (such as the elements of user corpus 230) based on, or to include information received and/or analyzed by NL processor 210C. (e.g., to add these results and/or determinations to contacts corpus 234 and/or other elements of corpus 230 illustrated in FIG. 2).

In embodiments a CVA can include a processing element that can "learn" (e.g., by using machine learning techniques) from, for example, interactions of a CVA with user information and/or recipients, and/or CVA performance of various CVA functions. In embodiments, machine learning techniques can, for example, utilize an aggregate prediction model, in which a learning element can predict aspects of CVA functions and/or recipient interactions, for example, based on similar aspects of prior functions, interactions, and/or information.

Such a learning element can, in response, refine or otherwise improve the ability of that CVA to perform CVA functions. In embodiments, improving the performance of CVA functions can include, for example, improving determining, by the CVA, elements of user information that can be communicated with particular ancillary recipients privy to that information, and/or improving determination of preferred times and/or means of communicating information in a preferred presentation. In another example, improving the performance of CVA functions can include the CVA modifying attributes (e.g., information type, urgency, and/or privacy attributes) associated with recipients and/or user information, such as to more precisely associate elements of that information with particular attributes.

Using the example of FIG. 2, learn processor 210A can, for example, receive CVA input information from CVA inputs 222, user corpus 230, and/or information from other elements of a computing system (not shown in FIG. 2) and/or CVA 200, such as analysis processor 210D. Learn processor 210A can utilize, for example, information included in user corpus 230 to analyze the results of CVA functions performed by CVA 200 and can provide those results to other elements of CVA 200. For example, as indicated by 224 in FIG. 2, learn processor 210A can output the results of such learning analysis to monitor 210B, NL processors 210C, and/or analysis processor 210D. These processors can utilize outputs of learn processor 210A to improve the ability of CVA 200 to perform CVA functions, such as analysis of CVA input information and/or information includes in user 230, determining a recipient context, and/or composing a preferred presentation.

Using the example of FIG. 2 to further illustrate using a learning element to improve performing CVA functions, contacts corpus 234 can, at a particular time, include persons having previously been present in a recipient and/or presentation context with a user associated with personal info corpus 232. Learn processor 210A can receive CVA input information from, for example, CVA inputs 220, user corpus 230, and/or analysis processor 210D, that can include information (e.g., a voice recording, or visual image) identifying a person present with that user in a recipient context, but not presently included in contacts corpus 234. Learn processor 210A can, in response, update contacts corpus 234 to include that person as a contact associated with the user. It would be apparent to one of ordinary skill in the art that a learning element of (or, alternatively, communicatively coupled to) a CVA, such as learn processor 210A, can utilize various information available to that CVA (e.g., inputs, corpora, and/or outputs of other processing elements of a CVA) to improve the performance of CVA functions by that CVA.

To further illustrate the example of FIG. 2, analysis processor 210D can, for example, determine and/or compose user information to communicate; recipients that should and/or can receive the information; a presentation context associated with the recipients (e.g., a presentation context based on a location and/or activity of a primary recipient); and/or whether all or only some of the information can be communicated based on recipients potentially privy to the communications. Analysis processor 210D can analyze and/or utilize CVA input information received from inputs CVA inputs 220, user corpus 230, and/or outputs of other processors among processors 200 to perform such functions.

For example, analysis processor 210D can analyze CVA input information received from CVA inputs 220, and/or information included in user corpus 230 (e.g., personal info corpus 232), to determine user information and/or a recipient context, to determine and/or compose attributes (e.g., urgency and/or privacy attributes) and of the user information/or recipients, and/or to compose a preferred presentation. Analysis processor 210D can modify, or add to, information in user corpus 230 based on, or to include, the results of such analyses and/or determinations (e.g., to add these results and/or determinations to personal info corpus 232, or history corpus 238).

With reference to the example of FIG. 2, an example use case can further illustrate a CVA performing various CVA functions. In FIG. 2, personal info corpus 232 can include, for example, medical information associated with user "Alice", who is a patient of provider "Carl". For example, such information can include diagnostic information having an urgency attribute corresponding to a time in which Alice and/or Carl should have, or schedule, a follow-up examination. Further, such diagnostic information (and/or related information) can have, for example, a high privacy attribute, as information that CVA 200 should communicate to only Allice and/or Carl.

CVA 200 can determine (e.g., by analysis processor 210D analyzing personal info corpus 232 and/or contacts corpus 234) that this is user information to communicate to Alice and/or Carl and can compose the diagnostic and/or follow-up examination information as user information for CVA 200 to communicate to Alice and/or Carl (e.g., using CVA outputs 220). CVA 200 can further determine (e.g., by analyzing attributes corpus 240) an urgency and/or privacy attribute associated with the user information and/or recipients, such as an urgency attribute associate with when must a follow-up examination occur, and/or a privacy attribute corresponding to the information being private to just Alice and/or Carl, or that Alice and/or Carl can receive that information as recipients.

At a particular time, CVA 200 can receive CVA input information, such as voice input from inputs among 220, indicating the presence of Alice, and/or Carl, at a location at which CVA 200 can communicate the user information to Alice and/or Carl. CVA 200 can determine that this recipient context is a presentation context in which CVA 200 can communicate the user information to Alice and/or Carl, and CVA 200 can compose a presentation context that includes the location and/or Alice and Carl as recipients. CVA 200 can include that presentation context in a preferred presentation. In determining a recipient context, and/or composing a presentation context, CVA 200 can analyze that information (e.g., by NL processor 210C using natural language processing techniques) to determine that it is Alice, and/or Carl, present and/or to determine subject matter, and/or context, of CVA input information (e.g., subject matter, and/or context, of a conversation occurring between Carl and Alice, as received by monitor 210B).

CVA 200 can utilize a recipient context, urgency and/or privacy attributes (e.g., included in attributes corpus 240), and/or information included in user corpus 230 (e.g., information about future appointments involving Alice and/or Carl) to compose a preferred presentation that includes, for example, a presentation context including Alice and Carl present together at the location indicated in the CVA input information. CVA 200 can modify user information to present to Alice to comport with, for example, information attributes of the user information, and/or recipient attributes associated with Carl.

CVA 200 can further utilize information included in CVA input information and/or user corpus 230 to determine that the location includes an output device (e.g., a laptop computer, mobile device, or a speaker) to which CVA 200 can output the user information, and CVA 200 can include the output device, as an output means, in a preferred presentation. Based on the resulting preferred presentation, CVA 200 can output the user information (or, alternatively, user information modified based on information and/or recipient attributes) to Alice and Carl while they are present at the location (e.g., within that recipient context), using the output device, included in that preferred presentation.

CVA 200 can determine an alternative presentation context, and/or alternative output means, that can provide a better context and/or means to present the information, or that can include alternative, or unmodified, user information. For example, CVA 200 can determine that the location and/or output device can be included in an alternative preferred presentation, but that a later time (e.g., a later time at which Alice and Carl are scheduled to be present in that same location) that comports with urgency and/or privacy attributes of the user information. CVA 200 can compose an alternative preferred presentation including that alternative time. In another example, CVA 200 can determine that the location and/or output device can be included in an alternative preferred presentation, but which includes a later time (e.g., a time at which only Alice is, or is likely to be, present, without ancillary or incidental recipients present in the recipient context) at which CVA 200 can communicate (i.e., output) unmodified user information to Alice.

In another example use case, a user can utilize a CVA to assist in managing daily activities, such as dietary needs or plans. For example, CVA 200 can include (e.g., in personal info corpus 232) information regarding dietary needs, or plans, for a user, "Ana", who utilizes CVA 200 to assist in managing her diet. Ana's residence can include input devices coupled to CVA 200, such as a microphone and/or camera. CVA input information, received at a particular time by CVA 200 from the input devices, can indicate the presence of Ana within Ana's residence. The CVA input information can further indicate that another person is present with Ana at that time.

CVA 200 can utilize CVA input information, received from such input devices, to determine a recipient context that includes the presence of both Ana and the other person in the room. CVA 200 (e.g., analysis processor 210D) can further analyze the CVA input information in combination with information in user corpus 230 (e.g., information in contacts corpus 234) to determine that the other person present with Ana is her friend, "Robert". CVA 200 can have monitored previous conversations between Robert and Ana and can have previously determined a recipient context, and/or composed a presentation context, that included Robert present with Ana in her residence.

Based on such prior conversations, and/or information and/or recipient attributes included in user corpus 230, CVA 200 can determine, for example, subject matter that Ana is (or, alternatively, is not) comfortable discussing with Robert, and/or other persons having particular relationships with Ana. CVA 200 can, for example, analyze previous conversations between Ana and Robert, and/or other persons, using a user corpus and can modify such a corpus to improve CVA 200's awareness of subject matter to present to Ana in differing presentation contexts (e.g., when Robert or another person is present with Ana).

CVA input information, and/or information included in user corpus 230, can further include information regarding refreshments Ana is serving to Robert. In response, CVA 200 (e.g., analysis processor 210D) can assess dietary characteristics of such refreshments (e.g., utilizing a connection to the Internet, and/or information included in user corpus 230). Based on this information, CVA 200 can compose the dietary information into user information to communicate to Ana. For example, CVA 200 can compose user information including dietary characteristics of the refreshments and that they exceed particular dietary limits included in Ana's dietary needs or plans (such as can be included in user corpus 230).

CVA 200 can further determine that the information has a privacy attribute such that a presentation context including Robert being privy to (e.g., as an ancillary or incidental recipient) audible communications from CVA 200 to Ana is not appropriate for CVA 200 to communicate this information while Robert is present with her, and/or by a means by which Robert can be privy to that user information. Further, CVA 200 can determine (e.g., using information in user corpus 230), for example, that exceeding dietary guidelines in Ana's dietary plan does not pose significant detriment to Ana's diet for that day (e.g., Ana need not take any particular immediate action, such as not eating these refreshments), and so the user information has a low urgency attribute.

Based on these analyses and determinations, CVA 200 can compose a preferred presentation to communicate that user information to Ana. For example, CVA 200 can compose a preferred presentation that includes an alternative presentation context that does not include Robert present with Ana (e.g., an alternative time or location), a subset of the personal information (e.g., recommending an alternative refreshment, without reference to Ana's dietary plans) that comports with privacy attributes associated with Robert, or an alternative output means (e.g., a smart watch, or mobile device used by Ana) to communicate to Ana and that can prevent, or avoid, Robert being privy to that user information, in that recipient (or, an alternative presentation) context. CVA 200 can then output the user (or, modified user) information to communicate the information to Ana according to the characteristics of that preferred presentation.

Figure 3:
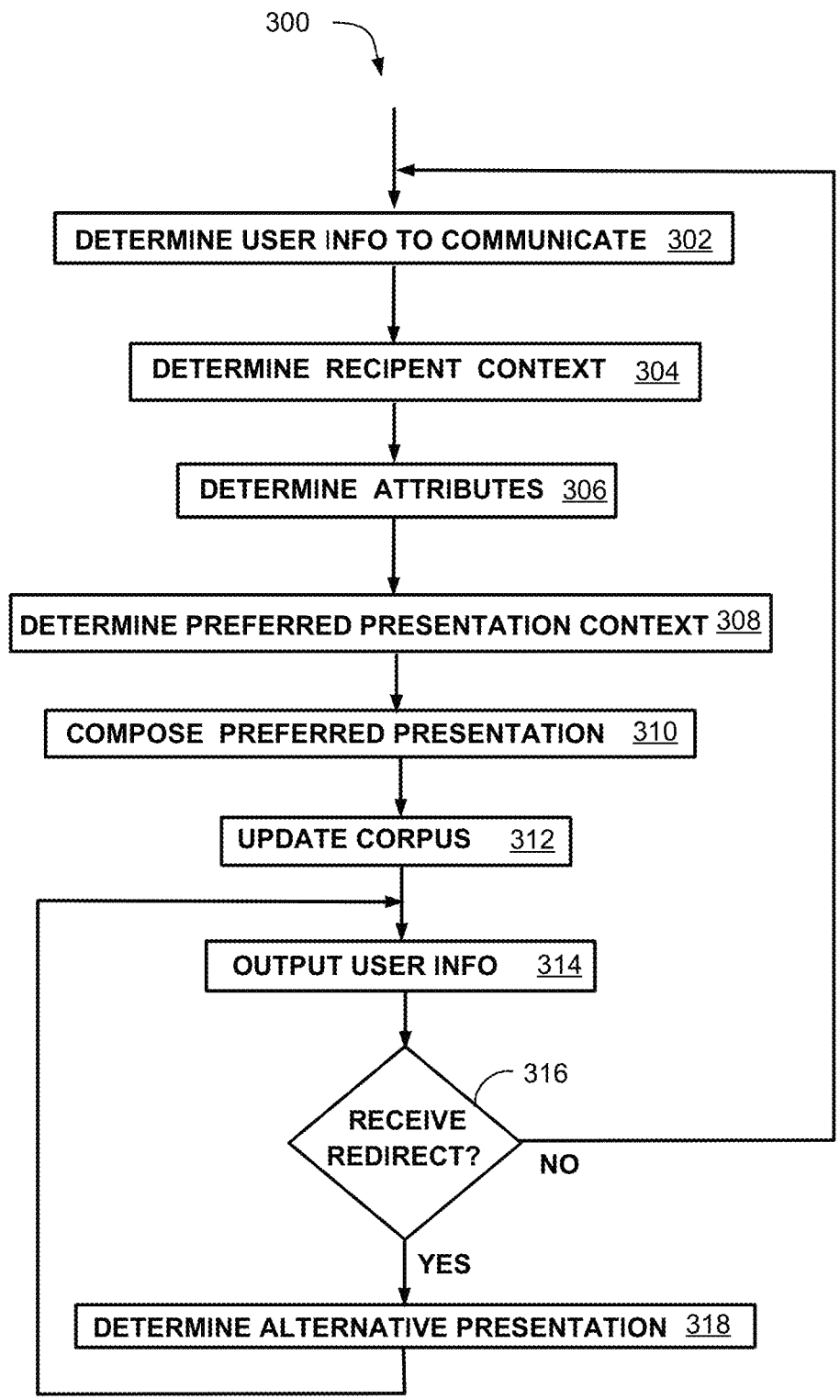
FIG. 3 is a flowchart illustrating an example method for performing CVA functions, according to aspects of the disclosure.

The foregoing examples and description of FIG. 2 and CVA use cases illustrate example structural element, and interactions among these elements, of an embodiment of a CVA. Embodiments, such as CVA 200 in FIG. 2 and/or alternative embodiments, can utilize a method for performing CVA functions. FIG. 3 illustrates example method 300 for performing CVA functions. To illustrate the method, but not intended to limit embodiments, the method is described herein as performed by a CVA, such as in the example of CVA 200 of FIG. 2. However, it would be apparent to one of ordinary skill in the art that such a method, and/or elements of such a method, can be embodied in computing systems, and/or elements of computing systems, other than those illustrated by the examples of FIG. 2.

At 302 of method 300, a CVA determines user information to communicate to a primary recipient, such as a user of the CVA, or a person that has a relationship to a user of the CVA that qualifies that person to be a primary recipient of the information. For example, as previously described in reference to FIG. 2, in embodiments a CVA can analyze CVA input information (e.g., calendar information, or email, text, or voice messages) received from CVA inputs, and/or included in a user corpus, to determine user information to communicate to a recipient.

At 304 the CVA detects the primary recipient included within a recipient context to potentially receive the user information from the CVA. At 304, a CVA can detect a recipient context based on determining, at 302, that the CVA has user information to communicate to a recipient. For example, at 304 a CVA can analyze CVA input information (e.g., CVA input information received from CVA inputs such as 220 in the example of FIG. 2) and, optionally, information included in a user corpus (such as 230 in FIG. 2), to determine that a primary, and/or ancillary recipients, are present within a recipient context. A CVA can further, at 304, determine that the recipient context includes a device by which the primary recipient can receive the user information from the CV, and/or whether or not other recipients (and, optionally, their identities) may be privy to the information to user information communicated from the CVA using that device (or, alternative devices). For example, in an embodiment a CVA can receive inputs from sensor and/or computing devices, such as those in the example input devices 110 and output devices 112 of FIG. 1, to determine a recipient context.

At 306, the CVA can determine information and/or recipient attributes corresponding to, or associated with, the user information and/or recipients in the recipient context. For example, in an embodiment a CVA can analyze information included in a user corpus, such as 230 in FIG. 2, to determine privacy and/or urgency attributes of the user information to communicate, and/or recipients included in a recipient context determined at 304. As previously described, in an embodiment a CVA can dynamically determine the attributes, and/or modified user information, in response to, or in conjunction with, determining user info, at 302, and/or determining a recipient context, at 304. Alternatively, or in addition, a CVA can determine the attributes, and/or modified user information, using information included in a user corpus, and/or can modify a user corpus based on a recipient context determined at 304, and/or attributes determined at 306.

At 308, the CVA determines a presentation context for communicating the user information. A CVA can determine a presentation context based on, for example, analyzing user information to communicate, a recipient context determined at 304, information attributes of the user information and/or recipient attributes determined at 306, and/or information included in a user corpus. At 308, a CVA can modify a user corpus based on the analysis and/or the determination of a presentation context.

At 310, the CVA composes a preferred presentation to communicate the information. In an embodiment, composing a preferred presentation can include determining a particular time; a particular location (e.g., a location of a recipient); a particular presentation context that, for example, includes or, alternatively, excludes particular recipients; and/or, a particular output means (e.g., communications device), to communicate the user information to a recipient included in a preferred presentation. A CVA can utilize the results of operations 302-308, for example, at 310 to compose a preferred presentation of the information to recipients. An embodiment can utilize the results of operations 302-308 in combination with information included in a user corpus, such as 230 of FIG. 2, and/or inputs from other devices (such as input and/or output devices illustrated in FIG. 1) to determine a preferred presentation.

At 310, the CVA can determine a preferred presentation based on a particular presentation context for communicating the user information, in combination with privacy and/or urgency attributes of the user information. For example, at 310 the CVA can analyze recipients included in a recipient context determined at 304 and, based on privacy and/or urgency attributes of the user information, and/or privacy attributes associated with the recipients included in that presentation context, the CVA can determine a preferred presentation that comprises a time, location, and output means for communicating the user information included in that recipient context.

Alternatively, the CVA can determine, at 310, that a recipient context determined at 304 does not, for example, comport with privacy, and/or urgency, attributes associated with the user information and/or recipients included in that presentation context. In response, at 310 the CVA can determine an alternative presentation context that includes more or, alternatively, fewer recipients than included in the recipient context determined at 304. A CVA can further determine an output means to include in a preferred presentation.

At 312, the CVA can, optionally, update a user corpus and can update that corpus based, for example, on information received in performing 302-310, and/or the results of operations among 302-310. For example, a CVA can include a learning processor, such as learn processor 210A in CVA 200 of FIG. 2, and the learning processor can update a user corpus based on the learning processor analyzing information received and/or utilized in performing operations among 302-310, and/or results of analyzing that information in 302-310.

At 314, the CVA can output user information, to communicate the user information to recipients, based on a preferred presentation determined at 310. For example, at 314 the CVA can output user information, determined at 302 (or, a modified version of user information determined at 302, such as can be modified at 310) to a primary recipient, determined at 304, utilizing a time, location, and/or means to communicate that information include in the preferred presentation composed at 310. For example, a CVA can modify a user corpus based on privacy and/or urgency attributes, determined at 306, of the user information determined at 302, and/or recipient(s) determined at 304, a presentation context determined at 308, and/or a preferred presentation composed at 310.

At 316, a CVA can, optionally, receive an instruction to redirect communication, at 314, of the user information. For example, a CVA can output to a primary recipient (e.g., a user of a CVA) an announcement that it has user information to communicate. Such an announcement can comprise, for example, a particular kind of user information to communicate, and/or a portion of user information to communicate. In response to the announcement, a recipient can, for example, instruct the CVA to communicate the information in an alternative presentation context (e.g., using an alternative time and/or location) and/or output means to communicate the user information. For example, a CVA can receive a redirect instruction at 316 to instruct the CVA to communicate the information at a particular later time, at a particular later location, in a presentation context that includes or, alternatively, excludes particular other recipients, and/or using a particular alternative means to communicate the information.

To illustrate further, at 314 a CVA can output an announcement using an audible device (e.g., a speaker), or an application on a computing device (e.g., a "pop-up" notification application), that can present the announcement to one or more recipients. In response to the announcement, a recipient can instruct the CVA to determine an alternative presentation context and/or output means. In an embodiment, a recipient can redirect a CVA such as by means of a voice command to a microphone, or a user interface command to an application, which can be received as an input by a CVA.

If, at 316, the CVA does not receive a redirect instruction or, if the CVA does not include an option to receive a redirect instruction, the CVA can repeat 302 to determine user information to communicate. Alternatively, if a CVA includes an option to receive a redirect instruction and, at 316 receives a redirect instruction, at 318 the CVA can determine an alternative preferred presentation. At 318, in an embodiment, determining an alternative preferred presentation can be based on, for example, information included in a user corpus (e.g., 230 in FIG. 2), CVA input information, and/or information received with a redirect instruction.

Figure 4:
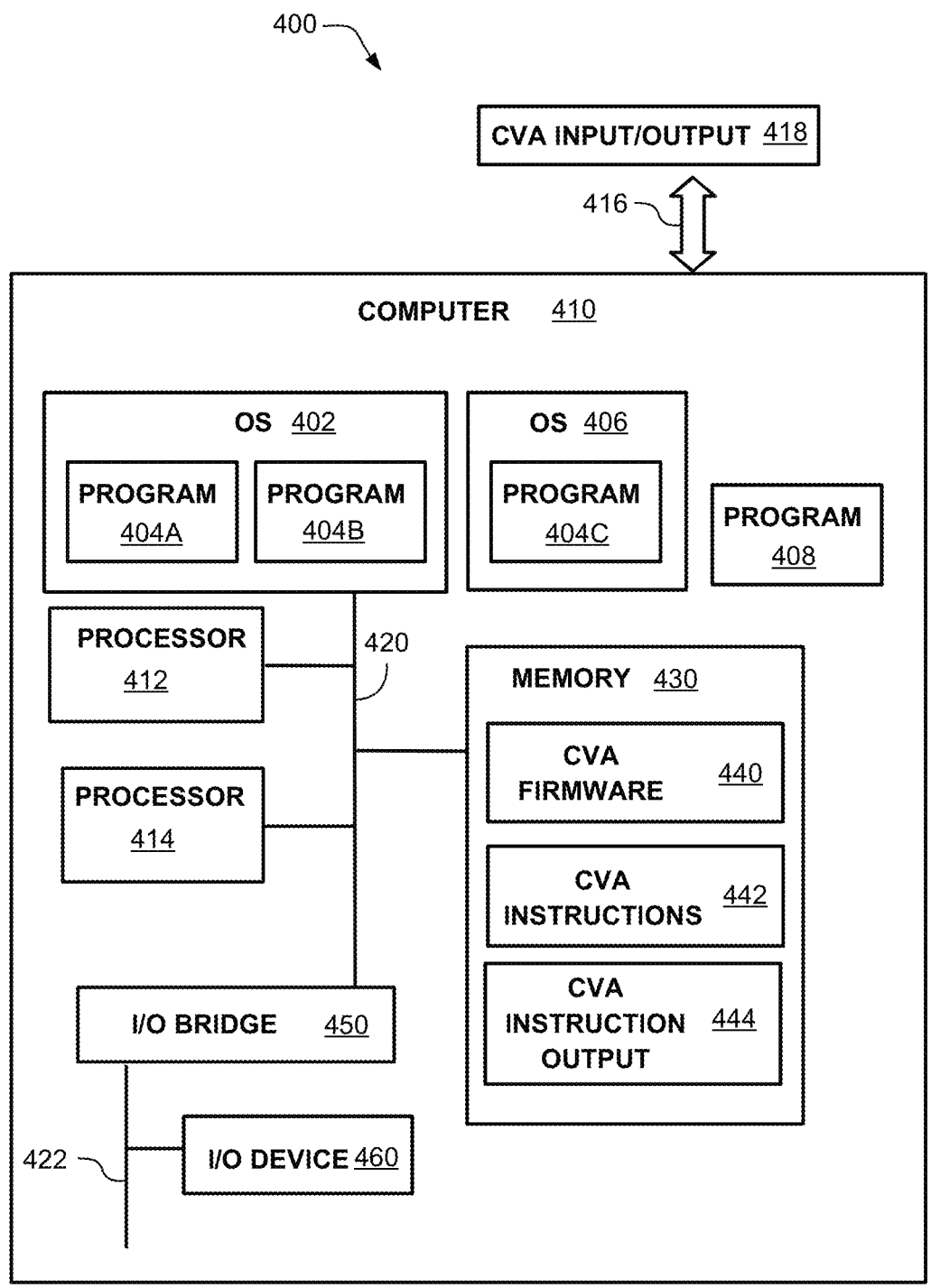
FIG. 4 is a block diagram illustrating a computing system that can embody methods and structures of the disclosure.

Embodiments can comprise a computing system, or components thereof, such as illustrated by example computing system 400 in FIG. 4. As shown in FIG. 4, computing system 400 includes computer 410 coupled by interface 416 to CVA input/output 418. For purposes of illustrating the disclosure, in FIG. 4 computer 410 illustrates an example "computing device" capable of embodying methods and/or structures of the disclosure. However, this not intended to limit embodiments and it would be understood by one of ordinary skill in the art that embodiments can utilize various computing devices, comprising elements and/or components, and/or configured, other than as illustrated by the example of computer 410.

FIG. 4 depicts computer 410 having processors 412 and 414. In embodiments processors, such as 412 and/or 414, can be a single-threaded processor or a multi-threaded processor, a general purpose or a special purpose processor, a co-processor, or any of a variety of processing devices that can execute computing instructions.

As shown in FIG. 4, in computing system 400 interface 416 couples computer 410 to CVA input/output 418. In embodiments, interface 416 can enable computer 410 to receive, or otherwise access, CVA input data (such as personal information and/or recipient context information) and/or output data (such as user information to communicate to a recipient, or data to modify a corpus). For example, CVA input/output 418 can comprise data received from an input device, such as among devices 110 and/or 112 in FIG. 1, and/or input data received from a corpus, such as 230 in FIG. 2. Such information can include, for example, recipient context, attributes, contact, historical, preference, and/or personal information associated with a user of a CVA and/or information recipients. Interface 416 can be configured to couple computer 410 to other I/O devices, and/or to communicate, or enable communicating, CVA input/output 418 from, or to, a person. It would be apparent to one of ordinary skill in the art that interface 416 can be any of a variety of interface types or mechanisms suitable for a computer, or a program operating in a computer, to receive, communicate, or otherwise access information input to, used by, and/or output by a CVA.

In embodiments CVA input/output 418 can additionally, or alternatively, comprise output data from computer 410, such as user information to output to an output device that can communicate user information to a recipient. CVA input/output 418 can comprise output data from a processing element of a CVA, such as the results of a learning, or natural language processing element, or output data to modify a corpus, such as 230 in FIG. 2. In embodiments, CVA input/output 418 can comprise instructions included in a computer programming product (CPP), and computer 410 can receive such instructions from CVA input/output 418 by means of interface 416. Processor 412 and/or 414 can be processors capable of executing instructions included in a CPP.

FIG. 4 further depicts processors 412 and 414 of computer 410 connected by memory interface 420 to memory 430. In embodiments a memory can be a cache memory, a main memory, a flash memory, or a combination of these or other varieties of electronic devices capable of storing information and, optionally, making the information, or locations storing the information within the memory, accessible to a processor. A memory can be formed of a single electronic (or, in some embodiments, other technologies such as optical) module or can be formed of a plurality of memory modules. A memory, or a memory module (e.g., an electronic packaging of a portion of a memory), can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words). In embodiments, memory 430 can store instructions, such as in CVA instructions 442, included in a CPP.

In embodiments, memory 430 can be, and/or a computer can include, a plurality of memories. A memory interface, such as 420, between a processor (or, processors) and a memory (or, memories) can be, for example, a memory bus common to one or more processors and one or more memories. In an embodiment, a memory interface, such as 420, between a processor and a memory can be point to point connection between the processor and the memory, and each processor in the computer can have a point-to-point connection to each of one or more of the memories. In embodiments a processor (e.g., 412) can be connected to a memory (e.g., memory 430) by means of a connection (not shown) to another processor (e.g., 414) connected to the memory (e.g., 420 from processor 414 to memory 430).

A computer, in an embodiment, can include an I/O bridge, which can be connected to a memory interface and/or (not shown) to a processor, for example. An I/O bridge, in an embodiment, can be a component of a processor or a memory. An I/O bridge can couple processors, memories, and/or other devices of a computer to I/O devices. For example, in FIG. 4 I/O bridge 450 can couple memory interface 420 to I/O devices, such as I/O device 460. In some embodiments, an I/O bridge can connect directly to a processor or a memory or can be a component included in a processor or a memory. An I/O bridge can connect to I/O devices by means of an I/O interface, such as I/O interface 422 of computer 410. In embodiments, an I/O interface, such as 422, can be any type of interface—such as an I/O bus, I/O link, network interface, etc.—suitable for communicatively coupling an I/O bridge, such as 450, to an I/O device, such as 460.

In embodiments an I/O device can be any of a variety of peripheral I/O devices, and/or I/O adapters connecting to peripheral I/O devices. For example, I/O device 460 can be a graphic card, keyboard or other input device, a hard drive or other storage device, a network interface cards, etc. I/O device 460 can be an I/O adapter, such as a Peripheral Component Interface (PCI) Express adapter, that connects components (e.g., processors or memories) of a computer to I/O devices (e.g., disk drives, Ethernet networks, video displays, keyboards, mice, etc.).

In embodiments a computing device, such as computer 410, can include instructions executable by one or more processors (or, processing elements, such as threads of a processor), such as 412 and/or 414, included in a computing device. The instructions can be a component of one or more programs. The programs, or the instructions, can be stored in, and/or utilize, one or more memories of a computer. As illustrated in the example of FIG. 4, computer 410 includes a plurality of programs, such as program 408 and programs 404A, 404B, and 404C (collectively, "programs 404"). In an embodiment a program can be, for example, an application program, an operating system or a function of an operating system—such as OS 402 and/or OS 406, in FIG. 4—or a utility or built-in function of a computer. A program can be a hypervisor (not shown in FIG. 4), and the hypervisor can, for example, manage sharing resources of the computer (e.g., a processor or regions of a memory, or access to an I/O device) among a plurality of programs or OSes.

A program can embody methods and/or structures of the disclosure. For example, in an embodiment, a program, such as 408 and/or among programs 404, can execute on processor 412 and/or 414 of computer 410 to perform example method 300 of FIG. 3, or portions thereof. In another example, in an embodiment a program can execute on processor 412 and/or 414 of computer 410 to perform functions of one or more processing elements of a CVA, such as among processors 210 of FIG. 2.

Programs can be "stand-alone" programs that execute on processors and use memory within the computer directly, without requiring another program to control execution of that program and/or that program's use of resources of the computer. For example, computer 410 includes stand-alone program 408. A stand-alone program can perform particular functions within a computing device, such as computer, such as CVA functions and/or controlling, or interfacing (e.g., access by other programs) an I/O interface or I/O device. A stand-alone program can, for example, manage the operation, or access to, a memory. A Basic I/O Subsystem (BI/OS), or a computer boot program (e.g., a program that can load and initiate execution of other programs) can be a standalone program.

A computer can include one or more operating systems, and an operating system can control the execution of other programs such as, for example, to start or stop a program, or to manage resources of the computer used by a program. For example, in FIG. 4 computer 410 includes OS 402 and OS 406, each of which can include, or manage execution of, one or more programs, such as OS 402 including (or, managing) programs 404A and/or 404B. In some embodiments, an operating system can function as a hypervisor.

In embodiments, a program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 410 includes CVA firmware 440 stored in memory 430. In an embodiment, CVA firmware 440 can comprise one or more programs that can perform CVA functions, method 300 of FIG. 3 or portions thereof, and/or functions of a processing processor of a CVA, such as among processors 210 of FIG. 2. Firmware, such as CVA firmware 440, in an embodiment can be embodied as instructions (e.g., comprising a computer program product) on a storage medium (e.g., a CD ROM, a flash memory, or a disk drive), and a computing device, such as computer 410, can access the instructions from the storage medium.

In embodiments, a computing device can include instructions to perform CVA functions, such as in the example of method 300 of FIG. 3, or functions of processors among processors 210 in FIG. 2. For example, in FIG. 2 programs among programs 404 and/or 408 can include CVA instructions 442, which can operate to perform CVA functions or functions of processors among processors 210 in FIG. 2 and can store the results of these functions and/or functions in CVA instruction output 444. A computing device can store the instructions and/or the instruction output in a memory of the computer, such as computer 410 storing program CVA instructions 442 and CVA instruction output 444 in memory 430.

The example computing system 400 and computer 410 are not intended to limit embodiments. In embodiments, computing system 400 can include a plurality of computing devices, processors, interfaces, inputs, outputs, and/or input/output devices, and can include other elements or components, such as networks, network routers or gateways, storage systems, server computers, virtual computers or virtual computing and/or I/O devices, cloud-computing environments, and so forth. It would be evident to one of ordinary skill in the art to include a variety of computing devices interconnected in a variety of manners in a computing system embodying aspects and features of the disclosure.

For example, in embodiments computer 410 can comprise any computing device having a processor capable of executing computing instructions and, optionally, a memory in communication with the processor. For example, computer 410 can be a desktop or laptop computer; a tablet computer, mobile computing device, or cellular phone; or, a server computer, a high-performance computer, or a super computer. Computer 410 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one of ordinary skill in the art that a computer embodying aspects and features of the disclosure can be any of a variety of computing devices having processors and, optionally, memories and/or programs.

Embodiments can comprise a system, a method, and/or a CPP at any possible technical detail level of integration. Aspects of the disclosure are described herein with reference to flowchart illustrations and/or block diagrams of methods, apparatus (systems), and computer program products (CPPs) according to embodiments of the invention. It will be understood that each block of the flowchart illustrations and/or block diagrams, and combinations of blocks in the flowchart illustrations and/or block diagrams, can be implemented by computer readable program instructions. In embodiments, a CPP can include a computer readable storage medium (or media) having computer readable program instructions thereon for causing a computing device to carry out aspects of the disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the disclosure.

Computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosure. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    performing, by a computer-implemented Contextual Virtual Assistant (CVA) system, a first analysis to determine to communicate first user information to a primary recipient, the first analysis directed to a first at least one of a user corpus and CVA input information, the user corpus associated with a user of the CVA system, the CVA input information received, by the CVA system from a first CVA input device, communicatively coupled to the CVA system, and associated with the user of the CVA system;
    applying, by the CVA system, at least one of first machine learning techniques and first natural language processing to a second at least one of the user corpus and the CVA input information to determine the first user information;
    receiving, by the CVA system from a second CVA input device communicatively coupled to the CVA system, input context information corresponding to a first recipient context, the first recipient context including the primary recipient
    performing, by the CVA system, in response to the receiving the input context information, a second analysis, the second analysis directed to the input context information to determine, at least in part, information recipients included in the first recipient context;
    determining, by the CVA system, based on the second analysis, that the information recipients included in the first recipient context include an ancillary recipient that is privy, in the first recipient context, to CVA output information communicated by the CVA system; and,
    applying, by the CVA system, at least one of second machine learning techniques and second natural language processing, to the user corpus and at least one of the input context information and the first user information, to determine second user information and a second recipient context, at least one of the second user information and the second recipient context based, at least in part, on the determining that the ancillary recipient is privy, in the first recipient context, to the CVA output information communicated by the CVA system, the second user information based further, at least in part, on the first user information, and the second recipient context comprising at least one of a preferred time, and a preferred location of the primary recipient, for the CVA system to communicate the second user information to the primary recipient.

2. The method of claim 1, wherein the method further comprises determining, by the CVA system, at least one of the second user information, the second recipient context, and a user information output device, communicatively coupled to the CVA system, to communicate the second user information to the primary recipient, based on a relationship attribute of the ancillary recipient.

3. The method of claim 1, the method further comprising the CVA system determining, based on the determining that the ancillary recipient is privy, in the first recipient context, to the CVA output information communicated by the CVA system, at least one of the preferred location of the primary recipient, included in the second recipient context, and the preferred time, included in the second recipient context, to differ from a respective location of the primary recipient, and a respective time, associated with the first recipient context.

4. The method of claim 1, wherein the method further comprises:
    determining, by the CVA system, based at least in part on the second user information and the second recipient context, a user information output device, communicatively coupled to the CVA system, to communicate the second user information to the primary recipient and,
    determining, by the CVA system, the second user information, the preferred time included in the second recipient context, the preferred location of the primary recipient included in the second recipient context, and the user information output device based further, at least in part, on at least one of a privacy attribute of the first user information and a privacy attribute of the ancillary recipient.

5. The method of claim 1, wherein the method further comprises determining, by the CVA system, at least one of the preferred location of the primary recipient included in the second recipient context, the preferred time included in the second recipient context, and a user information output device, communicatively coupled to the CVA system, to communicate the second user information to the primary recipient, based on at least one of a privacy attribute of the second user information and a privacy attribute of the ancillary recipient.

6. The method of claim 1, wherein the method further comprises:
    determining, by the CVA system, based on at least one of a privacy attribute of the ancillary recipient and a relationship attribute of the ancillary recipient, that the ancillary recipient is not authorized to receive information included in the first user information; and,
    determining, by the CVA system, at least one of the second user information, the preferred location of the primary recipient included in the second recipient context, the preferred time included in the second recipient context, and a user information output device, communicatively coupled to the CVA system, to communicate the second user information to the primary recipient, based on the determining that the ancillary recipient is not authorized to receive the information included in the first user information.

7. The method of claim 1, wherein the method further comprises:
   determining, by the CVA system, based at least in part on at least one of the first analysis and the second analysis, a recipient activity; and,
   determining, by the CVA system, based at least in part on the recipient activity, at least one of the second user information, the preferred time included in the second recipient context, the preferred location of the primary recipient included in the second recipient context, and a user information output device, communicatively coupled to the CVA system, to communicate the second user information to the primary recipient.

8. A computer-implemented contextual virtual assistant (CVA) system, the CVA system comprising
   at least one CVA input device communicatively coupled to the CVA system;
   at least one CVA output device communicatively coupled to the CVA system; and,
   at least one processor, wherein the at least one processor is configured to:
   perform a first analysis to determine to communicate first user information to a primary recipient, the first analysis directed to a first at least one of a user corpus and CVA input information, the user corpus included in the CVA system and comprising information associated with a user of the CVA system, the CVA input information received, by the at least one processor, from the at least one CVA input device and associated with the user of the CVA system;
   apply at least one of first machine learning techniques and first natural language processing to a second at least one of the user corpus and the CVA input information to determine the first user information;
   receive, from the at least one CVA input device, input context information corresponding to a first recipient context, the first recipient context including the primary recipient;
   perform, in response to the receiving the input context information, a second analysis, the second analysis directed to the input context information to determine, at least in part, information recipients included in the first recipient context
   determine, based on the second analysis, that the information recipients included in the first recipient context include an ancillary recipient that is privy, in the first recipient context, to CVA output information communicated by the CVA system; and
   apply at least one of second machine learning techniques and second natural language processing, to the user corpus and at least one of the input context information and the first user information, to determine second user information and a second recipient context, at least one of the second user information and the second recipient context based, at least in part, on the determining that the ancillary recipient is privy, in the first recipient context, to the CVA output information communicated by the CVA system, the second user information based further, at least in part, on the first user information, and the second recipient context comprising at least one of a preferred time, and a preferred location of the primary recipient, for the CVA system to communicate the second user information to the primary recipient.

9. The CVA system of claim 8, wherein the at least one processor is further configured to determine at least one of the second user information, the second recipient context, and a user information output device, among the at least one CVA output device, to communicate the second user information to the primary recipient, based on a relationship attribute of the ancillary recipient.

10. The CVA system of claim 8, wherein the at least one processor is further configured to determine, based on the determining that the ancillary recipient is privy, in the first recipient context, to the CVA output information communicated by the CVA system, at least one of the preferred location of the primary recipient, included in the second recipient context, and the preferred time, included in the second recipient context, to differ from a respective location of the primary recipient, and a respective time, associated with the first recipient context.

11. The CVA system of claim 8, wherein the at least one processor is further configured to:
   determine, based at least in part on the second user information and the second recipient context, a user information output device, from among the at least one CVA output device, to communicate the second user information to the primary recipient; and,
   determine at least one of the second user information, the preferred time included in the second recipient context, the preferred location of the primary recipient included in the second recipient context, and the user information output device based further, at least in part, on at least one of a privacy attribute of the first user information and a privacy attribute of the ancillary recipient.

12. The CVA system of claim 8, wherein the at least one processor is further configured to:
   determine, based at least in part on the second user information and the second recipient context, a user information output device, from among the at least one CVA output device, to communicate the second user information to the primary recipient; and,
   determine at least one of the preferred time included in the second recipient context, the preferred location of the primary recipient included in the second recipient context, and the user information output device based further on at least one of a privacy attribute of the second user information and a privacy attribute of the ancillary recipient.

13. The CVA system of claim 8, wherein the at least one processor is further configured to:
   determine, based on at least one of a privacy attribute of the ancillary recipient and a relationship attribute of the ancillary recipient, that the ancillary recipient is not authorized to receive information included in the first user information; and,
   determine at least one of the second user information, the preferred time included in the second recipient context, the preferred location of the primary recipient included in the second recipient context, and a user information output device, among the at least one CVA output device, to communicate the second user information to the primary recipient, based on the determining that the ancillary recipient is not authorized to receive the information included in the first user information.

14. The CVA system of claim 8, wherein the at least one processor is further configured to: determine, based at least in part on at least one of the first analysis and the second analysis, a recipient activity; and, determine, based at least in part on the recipient activity, at least one of the second user information, the preferred time included in the second recipient context, the preferred location of the primary recipient included in the second recipient context, and a user information output device, among the at least one CVA output device, to communicate the second user information to the primary recipient.

15. A computer program product for a computer-implemented contextual virtual assistant (CVA) system, the computer program product comprising a computer readable storage medium having program instructions embodied therewith, the program instructions executable by at least one processor to cause the at least one processor to:
perform a first analysis to determine to communicate first user information to a primary recipient, the first analysis directed to a first at least one of a user corpus and CVA input information, the user corpus associated with a user of the CVA system, the CVA input information received, by the CVA system, from a first CVA input device, communicatively coupled to the CVA system, and associated with the user of the CVA system;
apply at least one of first machine learning techniques and first natural language processing to a second at least one of the user corpus and the CVA input information to determine the first user information;
receive, from a second CVA input device, communicatively coupled to the CVA system, input context information corresponding to a first recipient context, the first recipient context including the primary recipient;
perform, in response to the receiving the input context information, a second analysis, the second analysis directed to the input context information to determine, at least in part, information recipients included in the first recipient context;
determine, based on the second analysis, that the information recipients included in the first recipient context include an ancillary recipient that is privy, in the first recipient context, to CVA output information communicated by the CVA system; and
apply at least one of second machine learning techniques and second natural language processing, to the user corpus and at least one of the input context information and the first user information, to determine second user information and a second recipient context, at least one of the second user information and the second recipient context based, at least in part, on the determining that the ancillary recipient is privy, in the first recipient context, to the CVA output information communicated by the CVA system, the second user information based further, at least in part, on the first user information, and the second recipient context comprising at least one of a preferred time, and a preferred location of the primary recipient, for the CVA system to communicate the second user information to the primary recipient.

16. The computer program product of claim 15, wherein the program instructions further cause the at least one processor to determine, based on the determining that the ancillary recipient is privy, in the first recipient context, to the CVA output information communicated by the CVA system, at least one of the preferred location of the primary recipient included in the second recipient context, and the preferred time, included in the second recipient context, to differ from a respective location of the primary recipient, and a respective time, associated with the first recipient context.

17. The computer program product of claim 16, wherein the program instructions further cause the at least one processor to:
determine, based at least in part on the second user information and the second recipient context, a user information output device, communicatively coupled to the CVA system, to communicate the second user information to the primary recipient; and,
determine at least one of the second user information, the preferred time included in the second recipient context, the preferred location of the primary recipient included in the second recipient context, and the user information output device based further, at least in part, on at least one of a privacy attribute of the first user information and a privacy attribute of the ancillary recipient.

18. The computer program product of claim 16, wherein the program instructions further cause the at least one processor to:
determine, based at least in part on the second user information and the second recipient context, a user information output device, communicatively coupled to the CVA system, to communicate the second user information to the primary recipient and,
determine at least one of the preferred time included in the second recipient context, the preferred location of the primary recipient included in the second recipient context, and the user information output device based further on at least one of a privacy attribute of the second user information and a privacy attribute of the ancillary recipient.

19. The computer program product of claim 16, wherein the program instructions further cause the at least one processor to:
determine, based on at least one of a privacy attribute of the ancillary recipient and a relationship attribute of the ancillary recipient, that the ancillary recipient is not authorized to receive information included in the first user information; and,
determine at least one of the second user information, the preferred time included in the second recipient context, the preferred location of the primary recipient included in the second recipient context, and a user information output device, communicatively coupled to the CVA system, to communicate the second user information to the primary recipient, based on the determining that the ancillary recipient is not authorized to receive the information included in the first user information.

20. The computer program product of claim 16, wherein the program instructions further cause the at least one processor to:
determine, based on at least one of a privacy attribute of the ancillary recipient and a relationship attribute of the ancillary recipient, that the ancillary recipient is not authorized to receive information included in the first user information; and,
determine at least one of the second user information, the preferred time included in the second recipient context, the preferred location of the primary recipient included in the second recipient context, and a user information output device, communicatively coupled to the CVA system, to communicate the second user information to the primary recipient, based on the determining that the ancillary recipient is not authorized to receive the information included in the first user information.

* * * * *